United States Patent [19]

Moeggenborg et al.

[11] Patent Number: 5,308,807
[45] Date of Patent: May 3, 1994

[54] PRODUCTION OF LEAD ZIRCONATE TITANATES USING ZIRCONIA SOL AS A REACTANT

[75] Inventors: Kevin J. Moeggenborg, Aurora, Ill.; Stephen A. Matchett, Grand Haven, Mich.

[73] Assignee: Nalco Chemical Company, Naperville, Ill.

[21] Appl. No.: 9,321

[22] Filed: Jan. 26, 1993

Related U.S. Application Data

[63] Continuation-in-part of Ser. No. 913,838, Jul. 15, 1992, abandoned.

[51] Int. Cl.⁵ .............................................. C04B 35/49
[52] U.S. Cl. .................................... 501/134; 501/12; 252/62.9
[58] Field of Search ................... 501/12, 134; 252/62.9

[56] References Cited

U.S. PATENT DOCUMENTS

| | | | |
|---|---|---|---|
| 4,230,589 | 10/1980 | Ogawa | 501/134 |
| 4,255,272 | 3/1981 | Ogawa | 501/134 |
| 4,283,228 | 8/1981 | Buchanan et al. | 501/134 |
| 4,954,464 | 9/1990 | Choi | 501/134 |
| 5,037,579 | 8/1991 | Matchett | 252/313.1 |
| 5,204,031 | 4/1993 | Watanabe | 501/134 |

FOREIGN PATENT DOCUMENTS

| | | | |
|---|---|---|---|
| 4056602 | 9/1965 | Japan | 252/62.9 |
| 0006609 | 1/1975 | Japan | 501/134 |
| 0187116 | 8/1987 | Japan | 501/134 |
| 0112104 | 4/1990 | Japan | 252/62.9 |
| 3177356 | 8/1991 | Japan | C04B 35/46 |
| 3177357 | 8/1991 | Japan | C04B 35/46 |
| 1133249 | 1/1985 | U.S.S.R. | 501/134 |

*Primary Examiner*—Mark L. Bell
*Assistant Examiner*—Deborah Jones
*Attorney, Agent, or Firm*—Dressler, Goldsmith, Shore & Milnamow, Ltd.

[57] ABSTRACT

The invention provides a method for producing a lead zirconate-lead titanate ceramic material (PZT ceramic) that exhibits higher fired density than conventional PZT ceramics and approximately equal electrical properties. The method employs zirconium oxide sol, containing extremely small zirconium oxide particles, as a raw material.

7 Claims, 2 Drawing Sheets

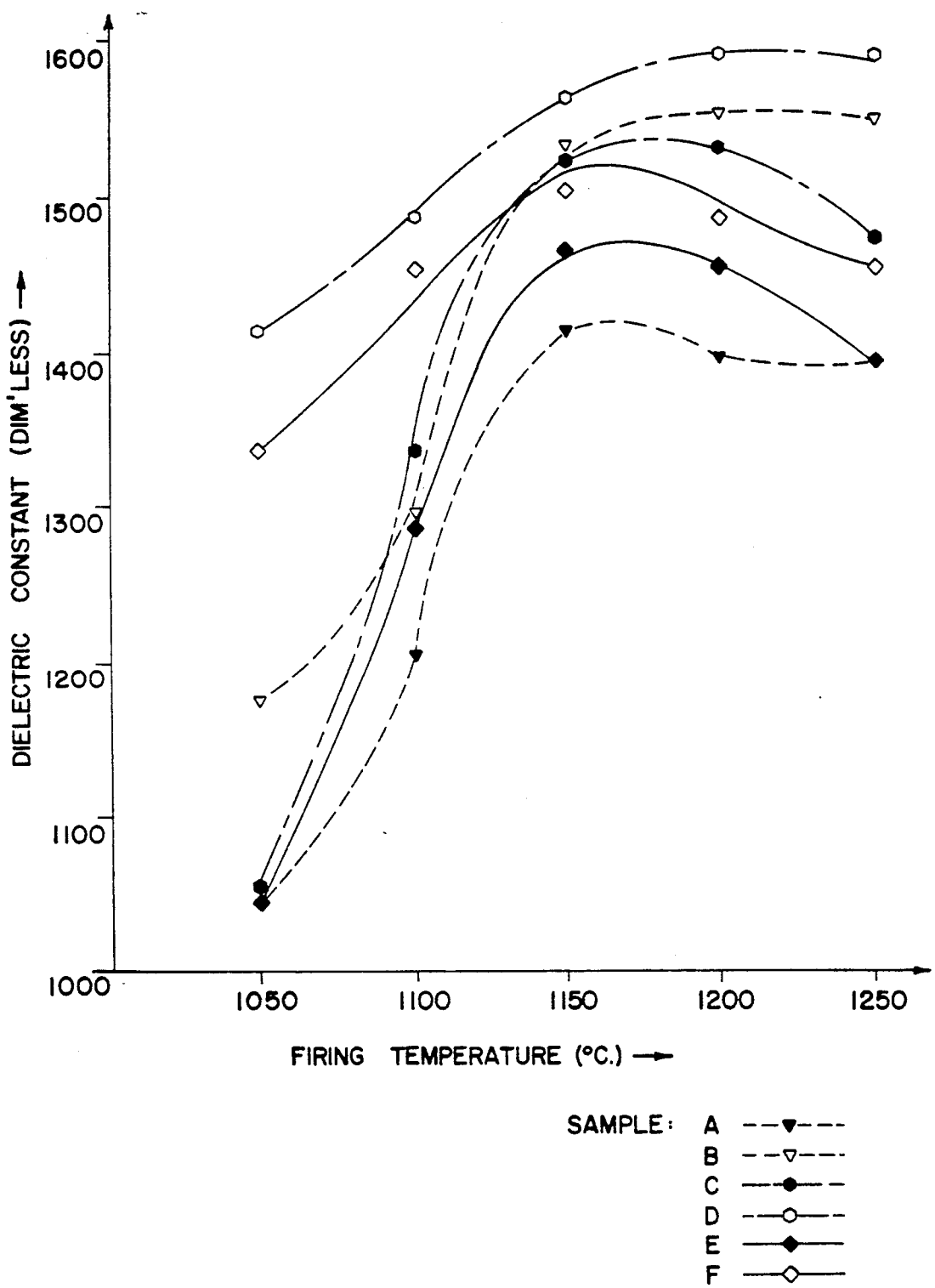

PRODUCTION OF LEAD ZIRCONATE TITANATES USING ZIRCONIA SOL AS A REACTANT

This application is a continuation-in-part of U.S. patent application Ser. No. 07/913,838 filed Jul. 5, 1992, now abandoned.

TECHNICAL FIELD OF THE INVENTION

The invention relates to a method of manufacturing a ceramic composition containing lead zirconate and lead titanate which utilizes zirconium oxide sol as a reactant.

BACKGROUND OF THE INVENTION

Ceramics containing lead, zirconium, titanium, and oxygen (PZT ceramics) offer a combination of mechanical and electrical properties which makes them the construction materials of choice for certain categories of electrical equipment. For example, PZT ceramics are employed as capacitors in resonant microwave filters where a high dielectric constant and a relatively durable, non-porous solid phase are required.

PZT ceramics are commonly prepared by mixing lead oxide, zirconium oxide, and titanium oxide in various proportions, sometimes with additional components, and calcining the mixture to induce a reaction which produces a solid solution. The solid produced may be subsequently ground to a powder, pressed into a desired shape, and subjected to a severe heat treatment known as sintering. Sintering removes microscopically small pores from between individual particles of the powder and, ideally, creates a singlephase polycrystalline material without voids which is mechanically durable and substantially homogeneous.

In practice, the small pores are not entirely removed by sintering and voidless polycrystalline phases are only approximated. Researchers currently attempt to increase the density of sintered PZT ceramics by reducing their porosity, and also seek ways of carrying out the sintering at lower temperatures. Additionally, because the grinding of PZT ceramic materials into powder form in preparation for sintering is cumbersome, PZT ceramics having softer particles at the end of the calcining step are desired.

SUMMARY OF THE INVENTION

The method for producing lead zirconate-lead titanate ceramics of the present invention employs, as a reactant, zirconium oxide having zirconium oxide particles with effective diameters in the range of about 60 to about 90 nanometers. The small particle size of the sol leads to greater reactivity of the zirconium oxide as compared to zirconium oxide powders which have a larger particle size. The ceramics produced by the method can be effectively calcined in the range of about 750° C. to about 850° C., rather than about 900° C. to 950° C. as conventionally required.

In one aspect, the invention provides a method of manufacturing a lead zirconate titanate ceramic. An aqueous zirconium oxide sol is provided which contains zirconium oxide particles having a size smaller than about 90 nanometers, preferably in the range of about 60 to about 90 nanometers. Lead oxide and titanium oxide in powder form are added to the sol with continuous stirring to produce a slurry. Optionally, additional zirconium oxide may be introduced into the slurry in powder form. The slurry is heated and stirring continues until sufficient water is evaporated to convert the slurry to a relatively stable, viscous paste. Subsequently, the paste is dried and calcined to produce a substantially homogeneous ceramic material.

Lead zirconate-lead titanate ceramics can be produced by the method of the present invention which exhibit relatively higher fired densities than previously known PZT ceramics having equal dielectric constants. The invention permits the ceramics to be calcined at lower temperatures and, subsequently, to be sintered at lower temperatures. Calcination at the relatively lower temperatures produces a softer aggregate particle. The time required to mill the softer particles to a given particle size is significantly less than for conventional PZT ceramic powders.

BRIEF DESCRIPTION OF THE DRAWINGS

FIG. 2 depicts the dielectric constants of the ceramic samples of FIG. 1 as functions of firing temperature.

DESCRIPTION OF THE PREFERRED EMBODIMENTS

Figure 1:
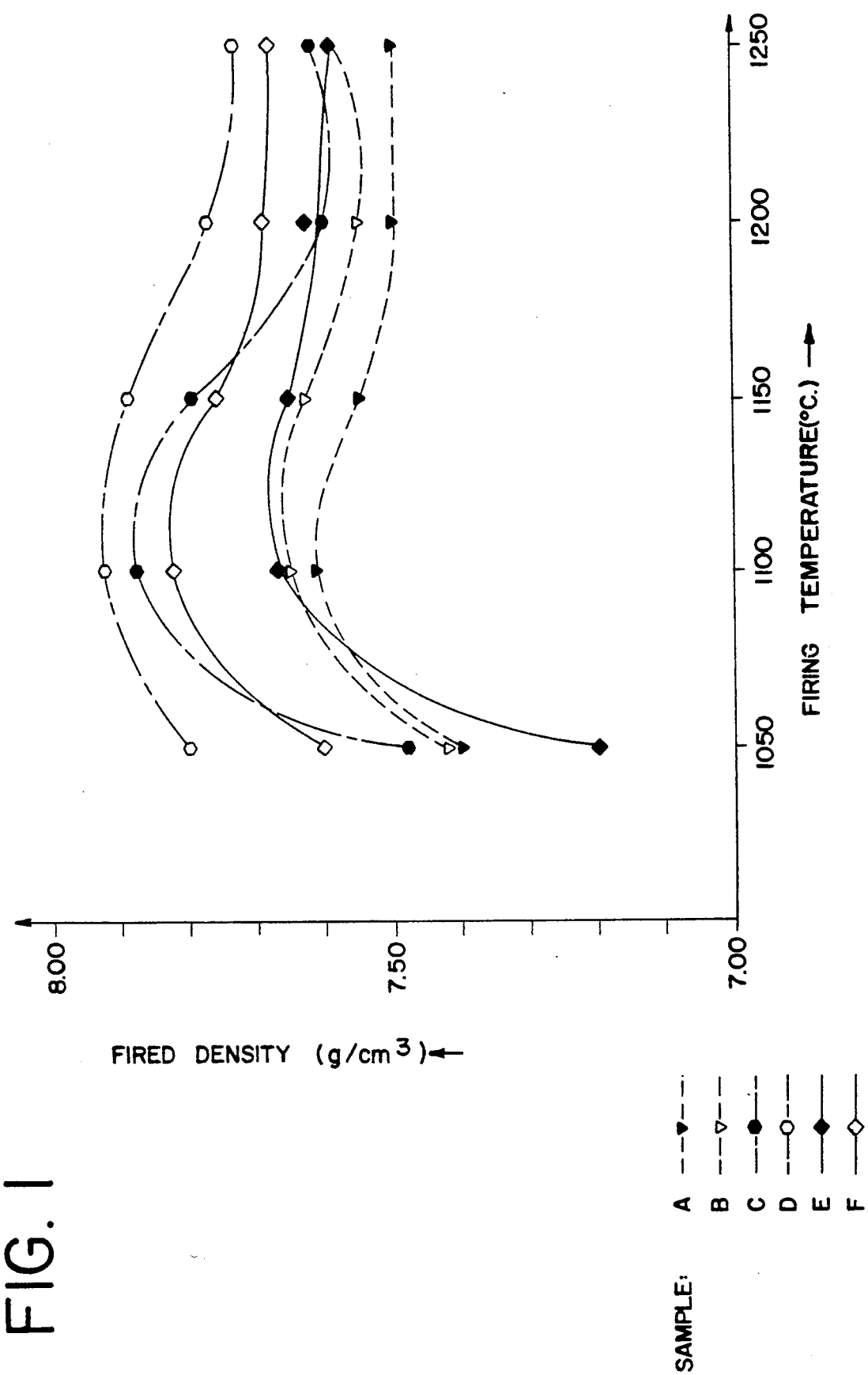
FIG. 1 is a graph illustrating the relationship of fired density to firing temperature for several ceramic samples.

The present invention is a method of manufacturing a lead zirconate titanate ceramic. The method involves the use of a zirconium sol having a particle size in the range of about 60 to about 80 nanometers as one of the raw materials for production of the ceramic. The small particle size, approximately one-twentieth of the size of zirconium oxide particles conventionally employed, leads to greater reactivity of the zirconium oxide. Combining the zirconium sol with oxides of lead and titanium, and an optional dopant such as neodymium oxide, in finely divided form produces a slurry which can be calcined at lower temperatures as compared to slurries prepared with conventional zirconium oxide powder. PZT ceramics produced by the present invention can have relatively lower sintering temperature requirements, higher fired densities, and other desirable properties.

The zirconium oxide sol employed, also called zirconia sol, is preferably an aqueous sol containing about 27% of zirconium oxide particles by weight. Zirconia sol produced from zirconium acetate and acetic acid by a hydrothermal process described in U.S. Pat. No. 5,037,579, which is herein incorporated by reference for its teachings regarding the hydrothermal process, is especially preferred for use in the present invention. However, it is believed that aqueous zirconia sols produced by other processes can be utilized provided that the sols contain zirconium oxide particles having an effective size smaller than about 90 nanometers, preferably in the range of about 60 to 90 nanometers and are substantially free of substances which might interfere with the interaction between the zirconium oxide and the lead and titanium oxides.

Neodymium oxide powder may, optionally, be added to the slurry. An amount of neodymium oxide in the range of about 0.5 to 5.0 wt. %, based upon the total weight of solids in the slurry, may be added to the sol with continuous stirring. Similarly, other dopant compounds can be added to the slurry in powdered oxide form, either in addition to the neodymium oxide or as alternatives.

Titanium oxide is mixed into the slurry with continuous stirring in an amount in the range of about 5 to about 20 wt. %., preferably about 11 wt. %. Powdered lead oxide is also combined with the slurry while stirring continues. A cationic dispersant, such as ammonium polymethacrylate, may optionally be added to the slurry to limit uncontrolled agglomeration of particles.

The slurry, having particulate components which are subject to settling if the stirring is terminated prematurely, must be converted to a form that is sufficiently stable for calcing. Otherwise, a resulting calcined ceramic would be non-homogenous and the properties of any powder produced from the nonhomogenous ceramic would be unpredictable. Therefore, the slurry is converted to a relatively viscous and stable paste by removing a sufficient amount of water. Preferably, the water is removed by an evaporation technique in which the slurry is gradually heated and stirred until a stable paste forms. The heating and stirring may be conveniently conducted in a ribbon blender.

The paste is further heated, without stirring to drive off substantially all free water, and create a solid cake. The dried cake is next calcined, for example, in an oven. Calcining refers to the process of heating the dried cake for a time at a temperature sufficient to cause a reaction between the individual components of the cake that produces a solid solution of lead, zirconium, and titanium oxides. X-ray powder diffraction analysis can be used to determine whether conversion to the PZT solid solution phases is complete or, alternatively, whether other phases, such as a $PbTiO_3$ phase or a lead oxide phase, persist.

A minimum required calcination temperature is defined as the minimum temperature required to produce essentially complete conversion to the PZT solid solution phase in a reasonable amount of time, here understood to be about 24 hours. The calcination time does not include the time required to raise the temperature of the cake to the calcination temperature, called ramping time. A particular sample may actually be calcined at a temperature higher than the minimum required calcination temperature, which is determined primarily by the structure and composition of the ceramic material.

It is a feature of the present invention that the ceramic material produced by the method described above transforms to PZT solid solution phase at lower calcination temperatures as compared to conventional ceramic materials. Ceramic material in accordance with the present invention has a minimum required calcination temperature in the range of about 750° C. to about 850° C. A satisfactory ramping time schedule for bringing the cake to the calcination temperature calls for holding the temperature of the cake at 105° C. for thirty minutes and, thereafter, raising the temperature of the cake at a rate such as 950° C. per hour to an intended maximum temperature. Because the purpose of holding for a time at 105° C. is to drive off excess water, the holding period is not necessary for cakes that are thoroughly dry at the start of heating. The maximum temperature is preferably held constant throughout a calcining period. The ceramic material is subsequently cooled by natural convection and radiation.

The PZT ceramic material produced by calcining is often milled to a fine powder which is later sintered to produce a relatively cohesive product in a desired shape. During such milling, it has been observed that the calcined PZT ceramic produced in accordance with the present invention is constituted by particles which are relatively softer than those of conventional PZT ceramics. The softer particles are an important advantage of the invention, reducing the milling time and energy required to produce a powder suitable for sintering. Observed hardnesses correlate, generally, with the temperatures at which the ceramics were calcined. Calcining a ceramic material at higher temperatures unnecessarily produces harder particles.

Particularly in small-scale manufacturing operations, the calcined ceramics may be reduced in size and treated with a binder through a multi-step process. The calcined ceramic particles are reduced in size, as by milling, to effective diameters in the range of about 1 micron. A binder is applied to the particles so that they can be more easily formed into a shape desired for a final product. The binder may be applied by tumbling the particles with a binder that is in liquid phase, allowing the particles to dry, and granulating the particles.

The particles with binder are compressed into the shape of the final product using, for example, a hydraulic press. Compressive forces in the range of about 5,000 to about 25,000 pounds per square inch are typically employed. Then the samples are heated to a sintering temperature, defined as the temperature which causes the particles to become a coherent mass without complete melting. A minimum required sintering temperature is the minimum temperature at which sintering can take place within a reasonable time, here understood to be about 12 hours.

Ordinarily, the sintering time will be preceded by a period of increasing temperature. For example, temperature of the particles may be increased from room temperature at a rate of about 200° C. per hour with good results. A binder burnout thermal treatment may be conducted before sintering, by maintaining the temperature of the particles at about 550° C. for approximately 2 hours. Preferably, the temperature during sintering is held constant in the range of about 1050° C. to about 1150° C. for a time period in the range of about 1 to about 3 hours. Thereafter, the fired ceramic materials are allowed to cool by natural convection and radiation.

After sintering, a ceramic composition in accordance with the present invention comprises about 99 wt. % of a solid solution of the general formula $Pb(Ti_xZr_{1-x})O_3$, where x is typically in the range of about 0.4 to about 0.6. The composition is relatively imporous and is constituted mainly by polycrystalline microstructures which define grain boundaries but relatively few micropores. A dopant, such as neodymium oxide, may be dispersed uniformly throughout the solid solution or segregated as a multitude of scattered microcrystalline structures embedded in the solid solution. The density of the polycrystalline solid solution phase without micropores is estimated to be about 8.0 grams per cubic centimeter.

The ceramic composition produced by the method of the present invention has a fired density, as measured after the sintering process and cooling, in the range of about 7.7 to about 8.0 grams per cubic centimeter. More particularly, the fired density range is about 7.8 to about 7.95 grams per cubic centimeter.

The dielectric constant of the composition after sintering is in the range of about 1000 to 1600, preferably about 1300 to about 1600. Dielectric constant, also called relative permitivity, is defined as the ratio of the permitivity of a particular material of interest to the permitivity exhibited by a perfect vacuum.

The following examples serve to further communicate the method of manufacturing of the present invention and the nature of the lead zirconate titanate ceramic material which may be produced by the method.

EXAMPLE 1

A conventional method was used to prepare two control samples, here designated sample A and sample B, by employing zirconium oxide powder as a raw material and calcining the samples at 950° C. and 900° C., respectively. Neodymium oxide (Nd$_2$O$_3$) obtained from the Johnson Matthey Corporation was utilized in the amount of 0.33 grams at 99.9% purity. The neodymium oxide, 3.68 grams of titanium oxide of 99+% purity obtained from Johnson Matthey, 6.65 grams of zirconium oxide obtained from MEI, and 22.32 grams of lead oxide obtained from Hammond Lead, Inc. were first combined and then stirred into 50.0 grams of deionized water. The resulting slurry was stirred for about 10 minutes and filtered using a 0.45 micrometer filter. A filter cake was removed from the filter and placed in a ceramic crucible.

After drying at room temperature overnight, the cake and the crucible were placed in an oven which was heated to 105° C. and maintained at 105° C. for 30 minutes. Thereafter, the temperature in the oven was increased at a rate of about 950° C. per hour to a temperature of 950° C. and held for about 6 hours. The calcined material was designated Sample A.

The procedure was repeated, except that in the latter procedure a second filtered cake and crucible were heated to 900° C. and held for 6 hours. The resulting material was designated Sample B.

EXAMPLE 2

37.29 grams of zirconium sol was mixed with 10.09 grams of zirconium oxide powder. The zirconium oxide sol had a particle size distribution in the range of about 60 to about 90 nanometers. The sol constituted 27.06 wt. % by weight of zirconium oxide, based on the total weight of the sol before any other components were added. Continuous stirring was initiated and 15 grams of water, 1.00 gram of neodymium oxide, and 11.14 grams of titanium oxide were added. With the aid of a magnetic stirring device, the slurry was heated and stirred until it had thickened significantly and formed a paste. A sample of the paste was dried in an oven at 105° C. overnight.

The next day the sample was removed from the oven and found to be dry. The sample was placed in a crucible and heated at the rate of about 950° C. per hour to a temperature of 900° C. and maintained at 900° C. for about 6 hours. The calcined sample is designated Sample C.

The same procedure was used to produce a Sample D except that Sample D was calcined at a temperature of 850° C. for about 6 hours.

EXAMPLE 3

The procedure described in Example 2 was repeated twice more with the following modifications to produce Sample E and Sample F. All of the zirconium oxide included in Samples E and F was added in the form of zirconium oxide sol. That is, 74.58 grams of zirconium oxide sol having a zirconium oxide content of 27.06% by weight was added to each sample. Sample E was calcined at 850° C. for six hours, while Sample F was calcined at 750° C. for six hours.

EXAMPLE 4

Each of the Samples A–F, described above, were milled to produce six powders having approximately equal particle diameter ranges and specific surface areas. For each of the Samples A–F, Table 1 below shows the specific surface area as measured by BET analysis and an estimated particle size before and after the milling procedure. The vibratory milling times shown are the milling periods required to reduce the initial particles to the size ranges shown for final particles. The samples were vibratory milled in deionized water.

The particle sizes were estimated using equation:

$$D_p = \frac{6}{(S.A.) \times P}$$

where p is the theoretical density, estimated as about 8.00 grams per cubic centimeter, and S.A. is specific surface area in meters squared/gram.

TABLE I

| Sample Designation | Sample Description | Initial Particles S.A. | Initial Particles (Dp) | Vibratory Milling Time | Final Particles S.A. | Final Particles (Dp) |
|---|---|---|---|---|---|---|
| A | 1. Control - 950° C. | 0.62 | (1.2μ) | 20 hrs. | 4.02 | (0.19μ) |
| B | 2. Control - 900° C. | 0.75 | (1.0μ) | 20 hrs. | 3.61 | (0.21μ) |
| C | 3. 50% sol - 900° C. | 0.31 | (2.4μ) | 16 hrs. | 3.44 | (0.22μ) |
| D | 4. 50% sol - 850° C. | 0.41 | (1.9μ) | 16 hrs. | 3.28 | (0.23μ) |
| E | 5. sol - 850° C. | 0.46 | (1.6μ) | 7 hrs. | 2.45 | (0.31μ) |
| F | 6. sol - 750° C. | 1.44 | (0.5μ) | 7 hrs. | 3.89 | (0.19μ) |

Inspection of Table I reveals that Sample E and Sample F required the least milling time to reduce the size of the intermediate particles to the particle range of about 0.2 micrometer. These relatively low milling times demonstrate that the PZT ceramic powders prepared from zirconium oxide sols contained softer aggregates which are more readily broken down by milling.

EXAMPLE 5

The milled powders were mixed with a non-aqueous binder commercially available from the DuPont Corporation under the designation DuPont 5200 TM. The powders were then dried, granulated, and sieved through an 80-mesh screen. Particles which passed through the screen were prepared for sintering by pressing the granulated powders into cylinders on a pellet press. After the samples were expressed from the press, they retained the shape of discs.

The disc-shaped samples were given a binder burnout thermal treatment at 550° C. for two hours. Thereafter, the disc-shaped samples were placed on platinum foil which was positioned in alumina crucibles. A lead oxide atmosphere was provided by placing premeasured amounts of lead zirconate powder in platinum boats around the crucibles in a firing oven and a sintering heat treatment was performed.

Table II presents the sintered densities for the various discs after sintering by firing for two hours at temperatures ranging from 1050° C. to 1250° C. Percentage weight changes for the samples are also included, with positive numbers indicating weight increases.

TABLE II

| Sample Designation | Sample Description | Fired density, g/cc, and (weight change) | | | | |
|---|---|---|---|---|---|---|
| | | 1050° C. | 1100° C. | 1150° C. | 1200° C. | 1250° C. |
| A | 1. Control - 950° C. | 7.39 (0.5%) | 7.62 (0.4%) | 7.55 (0.8%) | 7.50 (1.3%) | 7.50 (1.7%) |
| B | 2. Control - 900° C. | 7.42 (0.2%) | 7.65 (0%) | 7.63 (0.3%) | 7.55 (0.3%) | 7.59 (0.3%) |
| C | 3. 50% sol - 900° C. | 7.48 (0.7%) | 7.88 (0.5%) | 7.69 (0.6%) | 7.60 (0.4%) | 7.62 (0.7%) |
| D | 4. 50% sol - 850° C. | 7.81 (−1.0%) | 7.93 (−1.2%) | 7.79 (−1.2%) | 7.77 (−1.2%) | 7.74 (−1.1%) |
| E | 5. sol - 850° C. | 7.20 (−0.1%) | 7.67 (0.1%) | 7.65 (0.1%) | 7.63 (−1.0%) | 7.59 (−0.8%) |
| F | 6. sol - 750° C. | 7.60 (−0.2%) | 7.83 (−0.2%) | 7.76 (−0.2%) | 7.69 (−0.1%) | 7.68 (−0.3%) |

As can be seen in Table II, the sol-based materials which were calcined at lower temperatures exhibited fired densities which were generally higher than the fired densities of the control samples. As presented, all the samples possess fired densities greater than or equal to 90% of the theoretical density estimated for a solid solution PZT ceramic containing no pores. However, the fact that several test batches increased in weight during the sintering process suggests that some of the samples gained lead oxide from the atmosphere provided during firing. Typically, conventional PZT ceramics lose about ½ to about 1% of their weight during firing, with the weight loss being greater for materials having greater surface area.

EXAMPLE 6

Dielectric constant and loss from capacitance were measured at a frequency of 1 kilohertz and a temperature of 22° C. using a Hewlett-Packard 4274A multifrequency inductance-capacitance-resistance meter. Results are given in Table III below.

TABLE III

| Dielectric K and Loss from Capacitance (@ 1 kHz). | | | | | | |
|---|---|---|---|---|---|---|
| Sample Designation | Sample Description | Fired density, g/cc. and (loss) | | | | |
| | | 1050° C. | 1100° C. | 1150° C. | 1200° C. | 1250° C. |
| A | 1. Control - 950° C. | 1050 (1.9%) | 1210 (1.6%) | 1420 (1.6%) | 1400 (1.8%) | 1400 (1.6%) |
| B | 2. Control - 900° C. | 1180 (2%) | 1300 (1.8%) | 1540 (1.7%) | 1560 (1.8%) | 1560 (1.7%) |
| C | 3. 50% sol - 900° C. | 1060 (2.4%) | 1340 (2.0%) | 1510 (1.8%) | 1540 (1.8%) | 1480 (1.8%) |
| D | 4. 50% sol - 850° C. | 1420 (2%) | 1490 (1.9%) | 1570 (1.8%) | 1600 (1.8%) | 1600 (1.8%) |
| E | 5. sol - 850° C. | 1050 (1.8%) | 1290 (1.6%) | 1470 (1.5%) | 1460 (1.6%) | 1400 (1.4%) |
| F | 6. sol - 750° C. | 1340 (2%) | 1440 (1.9%) | 1510 (1.9%) | 1490 (1.7%) | 1460 (1.8%) |

All of the PZT ceramic materials tested exhibited loss from capacitance in the range of about 2%. All of the dielectric constants measured were between 1000 and 1600, for the most part being greater than about 1300. Relatively lower values were associated with low sample densities. Samples that had gained weight during a firing were found to exhibit relatively lower dielectric constants as compared to those samples that lost the most weight, presumably as lead oxide.

The data in Tables II and III, taken together, demonstrate that the method of the present invention can produce PZT ceramic materials from zirconium oxide sol which have approximately the same dielectric constant and loss from capacitance as conventionally prepared PZT ceramics, but possess relatively higher fired densities.

Specific embodiments of the invention, as well as examples of its use and theoretical explanations, have been presented to fully communicate the invention and not to limit the invention in any way. The scope of the invention is intended to be as broad as the claims will allow.

What is claimed is:

1. A method of manufacturing a lead zirconate titanate ceramic, which comprises:
   blending an aqueous zirconium oxide sol which contains zirconium oxide particles having an effective diameter smaller than about 90 nanometers with finely divided lead oxide and titanium oxide to create a slurry;
   heating the slurry with constant stirring until sufficient water is evaporated from the slurry to produce a relatively viscous paste; and
   drying and calcining the paste to produce a substantially homogeneous ceramic material.

2. The method of claim 1 wherein the paste is calcined at a temperature in the range of about 750° C. to about 850° C. for a time period in the range of about 3 to about 24 hours.

3. The method of claim 1 wherein the paste contains lead oxide in the range of about 55 to about 75 weight percent, zirconium oxide in the range of about 10 to about 30 weight percent, and titanium oxide in the range of about 5 to about 20 weight percent, based upon the total weight of solids in the paste.

4. The method of claim 3 wherein the paste also comprises in the range of about 1 to about 6 weight percent of a dispersant, based upon the total weight of solids in the paste.

5. The method of claim 1 which further comprises recovering the ceramic material as ceramic particles, forming the particles into a shape, and sintering the particles.

6. The method of claim 5 wherein the particles are sintered at a temperature in the range of about 1050° C. to about 1150° C. for a time period in the range of about 1 to about 3 hours.

7. The method of claim 1 wherein zirconum oxide particles have an effective diameter in the range of from about 60 to about 90 nanometers.

* * * * *